M. L. SEVERY.
CLUTCH.
APPLICATION FILED JAN. 24, 1912.
1,238,447.
Patented Aug. 28, 1917.
2 SHEETS—SHEET 2.
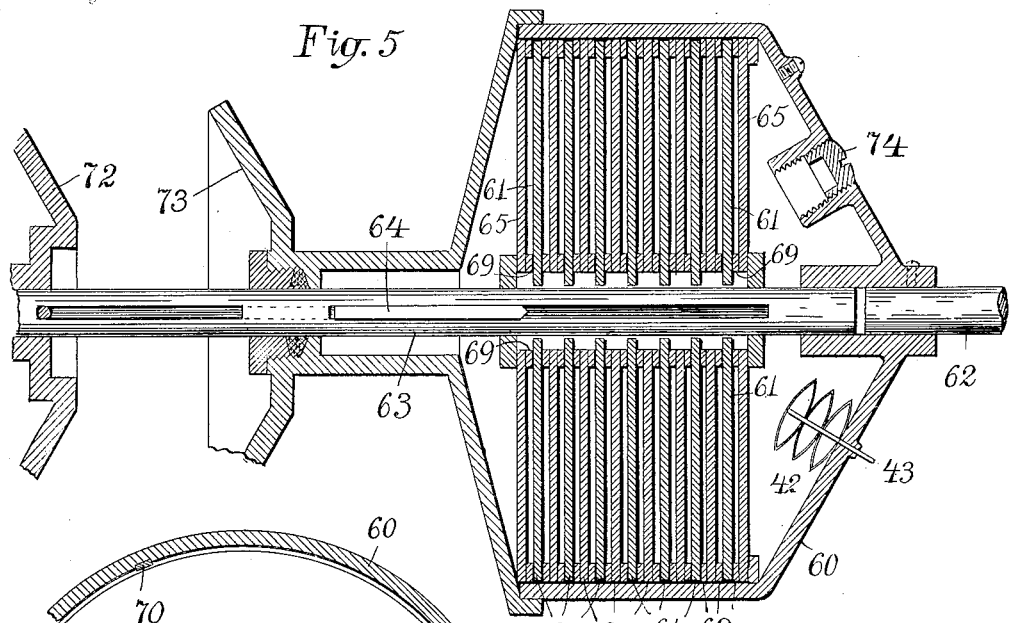
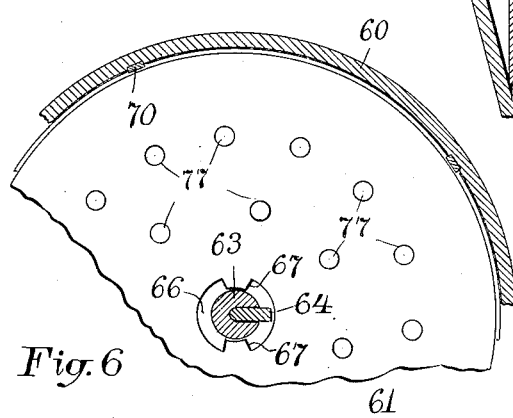
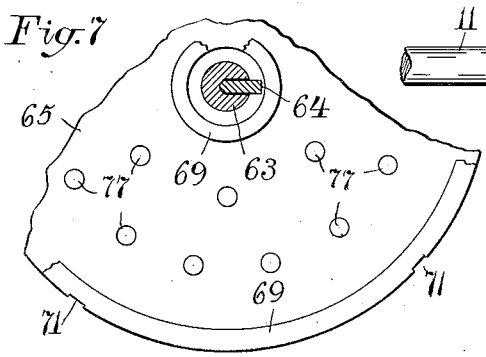
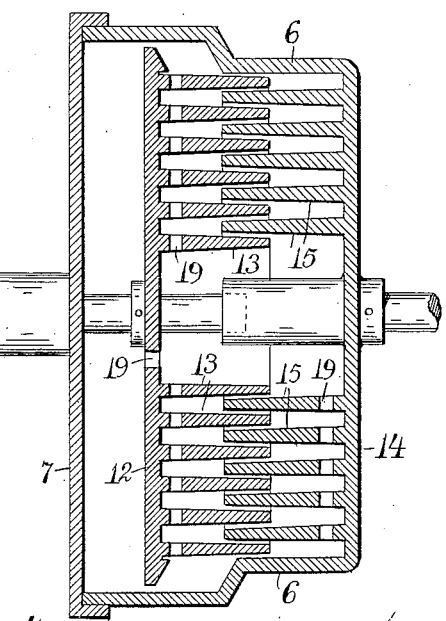
Witnesses;
M. H. Betts
E. E. Waite
Inventor,
Melvin L. Severy;
By
A. B. Upham,
Attorney.

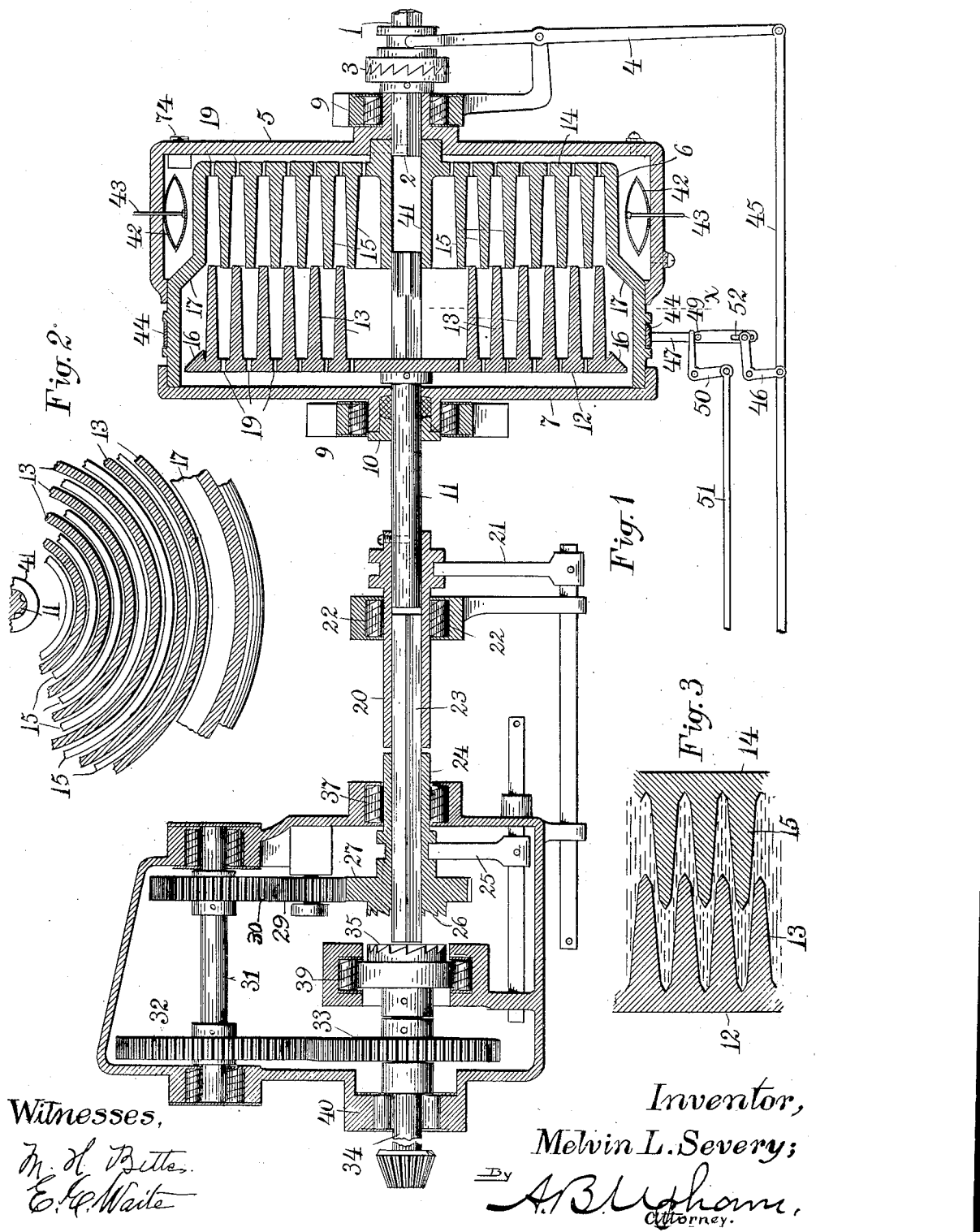

UNITED STATES PATENT OFFICE.

MELVIN L. SEVERY, OF ARLINGTON HEIGHTS, MASSACHUSETTS, ASSIGNOR TO SEVERY MANUFACTURING COMPANY, OF BOSTON, MASSACHUSETTS, A CORPORATION OF MASSACHUSETTS.

CLUTCH.

1,238,447.   Specification of Letters Patent.   Patented Aug. 28, 1917.

Application filed January 24, 1912. Serial No. 673,110.

*To all whom it may concern:*

Be it known that I, MELVIN L. SEVERY, a citizen of the United States, and a resident of Arlington Heights, in the county of Middlesex and Commonwealth of Massachusetts, have invented certain new and useful Improvements in Clutches, of which the following is a full and exact description.

This invention has for its object the construction of an improved clutch for the transmission of power, the same being specifically designed for transmissions varying from a retarding or braking action, through all degrees of speed increase, to the maximum of which the source of power is capable. My invention is especially intended for automobiles driven by internal combustion engines, but is well adapted for other purposes, as for lathes, drills and the like.

The underlying principle of this invention is based upon the adhesive and cohesive action of liquids, and the adaptation of the same to means for varying the extent or effect of superficial adhesion and the internal cohesion of the liquid itself, for the purpose of varying the slippage between the driving power and the driven mechanism.

As a result of experiments, I have discovered that the adhesion of a liquid to a surface is usually, if not always, greatly in excess of the cohesive force between the particles of the liquid, unless the film of liquid be relatively very thin; and I am persuaded that the cohesive force of a very thin film of a liquid is greater than the cohesive force of a considerable mass thereof. In other words, if a liquid be placed between two solid surfaces near together, it will be very difficult, if not impossible, to separate such surfaces so as not to leave them both wet with the liquid; that is to say, the liquid will part within itself rather than at one of the surfaces. If, now, these surfaces be moved upon each other while still separated by a film of liquid, the drag of the one upon the other will be greater for a thin than for a thick film of liquid. For this reason, I design in my mechanism not only to vary the extent of the overlapping surfaces, but I also vary the distance intervening between the said surfaces.

In this manner, the one set of members embraced in the mechanism pulls the other set around, as it were, by an almost infinite number of viscous, sticky ligaments, thereby dispensing with a rubbing friction, and so eradicating the great evils of a friction drive.

I have devised two types of devices for varying the extent and intensity of superficial adhesion; one in which there are two sets of annuli, one rotated by the driving power and the other rotating the driven mechanism, the annuli of one set intermeshing with the annuli of the other set. By sliding the sets into more extensive engagement, and by bringing their overlapping surfaces nearer together, the liquid in which the annuli are immersed has its extent and effect of superficial adhesion and internal cohesion increased in proportion.

The other type comprises two sets of thin disks in alternation, the one set revolved by the driving power, and the other set having means for varying the number rotating with the driven mechanism, the disks being closely juxtaposed but not in contact, and immersed in the liquid whose adhesion and cohesion cause it to serve as an impositive driving connection between them.

Referring to the drawings forming part of this specification, Figure 1 is a longitudinal section of a variable clutch made in accordance with one type of my invention. Fig. 2 is a transverse section of a part thereof taken on the dotted line X in Fig. 1, and looking toward the right. Fig. 3 is a longitudinal section on a somewhat larger scale of a modification of the annuli shown in Fig. 1. Fig. 4 is a longitudinal section of a slightly simplified form of the annuli and drum illustrated in Fig. 1. Fig. 5 is a longitudinal section of the disk type of the invention. Fig. 6 is a face view of a part of one of the disks employed in the latter type. Fig. 7 is a face view of a part of one of the disks belonging to the positively driven set.

Examining first Fig. 1, the reference numeral 1 designates the shaft adapted to receive power from any suitable source, and 2 is a separate shaft adapted to be driven with the same through clutch members 3 controlled by a clutch lever 4. Fixed upon the shaft 2 is the cylindrical casing or drum 5 within which and rigid with which is the body 6 closed at its open end by the detachable head 7; said head and casing having bosses rotatably supported by suitable bearings 9. Through the packed boss 10 extends a shaft 11 carrying upon the portion within the drum 6 a disk 12 supporting a multiplicity of annuli 13, preferably integral therewith.

Also preferably integral with the disk 14 are like annuli 15 postioned to intermesh with the annuli 13, in each case the annuli being thinner than the spaces between them. The disk 12 being fixed on said shaft 11, a longitudinal movement of the latter carries the annuli farther in between the annuli 15, at the same time bringing their overlapping surfaces nearer together; and the drum being filled with a suitable fluid, as a more or less viscous liquid such as heavy oil such as castor oil, or the like, said movement will increase the extent and effect of the fluid-adhesion and cohesion, and thereby increase the force with which the driving member turns the driven member. Such approach of the annuli surfaces is owing to the fact of the tapering cross section of the annuli, so that the superficial distances between the annuli of the opposing sets will be lessened coincident with the increase in juxtaposed surfaces, thereby increasing the intensity of the liquid action. Hence, as the annuli slide into more intimate engagement, the transmitting power of the liquid will be steadily increased until its maximum is reached.

By making use of a relatively large number of annuli placed relatively close together it is possible to transmit heavy torques. When the annuli have been brought fully into action, the conical friction surfaces 16, 17 will come into contact, and the power will be transmitted through such friction driving mechanism and all the slippage permitted by the liquid driving mechanism will be terminated. Before this friction clutch is thus put into control the bulk of the load is being carried by the interleaved annuli, so that the shock of engagement usually accompanying a friction driving mechanism is eliminated, and also any tendency to slip and grind.

To insure that the liquid between the annuli shall escape easily therefrom as the one set is pressed in between the other set, holes 19 are formed through the disks 12 and 14, as shown in said Fig. 1, and also through the annuli as illustrated in Fig. 4, although it is not necessary to have both arrangements of holes in the same machine.

For longitudinally shifting the shaft 11, a sleeve 20 is adapted to be controlled by a shipping arm 21; said sleeve being fixed upon the shaft and turning in suitable bearings 22. Slidable within said sleeve but turning with it, as by being square in cross section, is a shaft 23 carrying a sleeve 24 adapted to be longitudinally shifted by a shipping arm 25; said sleeve having a clutch member 26 and a spur gear 27, the latter being connected through an idler 29 with the gear 30 fixed on the counter shaft 31. On the last-named shaft is a spur gear 32 meshing with a spur gear 33 fixed on the shaft 34 from which power is transmitted in any suitable manner to the driving wheels of the automobile, or wherever else desired.

Also fixed on the shaft 34 is a clutch member 35 adapted to be engaged by said clutch member 26 after the latter has been unshipped from the idler 29, and thereby made to rotate the shaft 34 in the same direction as the shafts 23 and 11 are turning. Enough space is allowed between the two clutch members to permit the gear 27 to remain out of mesh with the gear 29, as well as out of engagement with the clutch member 35, thus providing another unshipping means for the quick disconnection of the power. Additional bearings 37, 39 and 40 are provided for the rotating parts just described.

Better to insure the proper positioning of the two sets of annuli 13, 15, the disk 14 is given an elongated boss 41 entered by the shaft 11, the latter being square, or grooved as illustrated in Fig. 2, to permit the escape of the liquid from within the boss.

Expansion and contraction of the fluid contents of the drum, or any slight leakage therefrom, is provided for by an expandible accordion device 42, the tubular stem 43 of which not only permits the entrance and escape of the atmosphere, but in addition acts as an indicator of the quantity of oil in the drum. Said devices 42 are each a resiliently expansible bulb, absolutely air and liquid tight, except through the tubular stem 43, which, although fastened to the inner surface of each bulb, does not open through such wall but has a suitable communication with the interior of the bulb, whereby the contraction given to the bulbs by increased pressure due to expansion of the oil is permitted, since the air in the bulbs can pass freely through said stems to the atmosphere, and any contraction or leakage of oil is compensated for by the expansion of the bulb.

To enable the unshipping of the clutch member 3 to be nearly synchronous with the application of a brake upon the drum 6, I surround the latter with a band brake 44, and so connect it with the shipping rod 45 through a bell crank lever 46 that the same movement of said rod which disengages said clutch members causes said band to tighten upon the drum and so to bring the latter to rest, said rod being carried for the purpose slightly beyond the distance necessary for the disengagement.

To apply such brake without unshipping the power, the rod 47 by which the bell crank lever 46 is connected with the band brake, is given a pin 49 adapted to be met by the bell crank lever 50 which is controlled by a shipping rod 51, the slot 52 permitting the movement of the rod 47 without affecting the bell crank lever 46 and its connected parts.

Substantially the only difference between the modification illustrated in Fig. 4 and that above described, is the omission of the casing 5 from the structure shown in Fig. 1; and the only different features shown in Fig. 3 is the adaptation of the outer edges of the annuli for frictional engagement with the opposing disks 12 and 14, by beveling said edges and correspondingly grooving said disks between the bases of the annuli.

In the disk type of my invention, the drum 60 has fixed within it a multiplicity of thin disks 65, as shown in Fig. 5, said drum and disks being forcibly rotated by the driving power. In said drum and in alinement with its driving shaft 62, is a shaft 63 connected with the driven mechanism. Longitudinally movable in the section of the shaft 63 within the drum is a spline 64 adapted to be moved through connections with the exterior of the drum. As best shown in Fig. 5 this spline extends longitudinally through the center of the shaft to a point outside the casing 60 where it is connected to the clutch member 72 to be shifted therewith so that as the clutch member 72 is moved toward the clutch member 73 the spline is advanced to pick up successive disks. See also Figs. 6 and 7.

Alternating with said disks 65 are similar disks 61 adapted to rotate freely between the same and also to permit the shaft 63 to rotate freely within them so long as the spline is in the retracted position shown in Fig. 5. As set forth in Fig. 6, each disk 61 has its central opening 66 provided with one or more projecting lugs 67, with which said spline will engage after it has been moved toward the right, and by which it will force such disks to rotate with the shaft 63. The farther the spline is thus moved and the more of the disks 61 which are thereby forced to turn with the shaft, the more forcibly will the latter be rotated; a liquid, as heavy oil, being maintained in the drum to give the necessary fluid adhesion and cohesion and the viscous pull exerted between the disks in the same manner as in the structure employing the annuli.

Very thin rings 69 are placed between the adjacent surfaces of the disks in order that the latter may not actually contact with each other, but that the liquid adhesion and cohesion may be the sole means of power transmission. These rings are preferably attached to the disks 65, as indicated in Fig. 7. The disks 65 may be held by the drum 60 and so made to rotate therewith, by being slightly larger than the other disks, and by being given splines 70 (Figs. 6, 7) engaging notches 71 in both the disks 65 and the drum.

The spline 64 above referred to, is given the longitudinal movements described, by having its outer connection controlled by the clutch member 72 (Fig. 5), which is designed to be shifted into contact with its coacting clutch member 73 at the moment when the spline 64 reaches and engages all the free disks 61. This provides the friction driving mechanism adapted to act only after the maximum liquid driving force has been applied, similarly to my first-described construction.

Fig. 5 shows a feature to be used in connection with the other forms of the invention, the same consisting of a screw plug 74 designed for taking up the space caused by the contraction or slight leakage of the drum's contents. By turning this screw inward, the chauffeur need not stop to introduce additional liquid every time that the stem 43 shows a slight diminution in the contents.

By suitably proportioning the holes 19 for the escape of the liquid from between the annuli, so that such escape must be gradual, there will be no need of cautioning the chauffeur not to let in the clutch too fast; and there can be no sudden jar or racing of the drive wheels and consequent slippage and wear of tires. The holes in the disks, shown at 77 in Figs. 6 and 7, facilitate getting the liquid properly between the disks, and the successive picking up of said disks by the spline prevents the chauffeur from letting in the clutch too quickly and thereby causing slippage and wear of tires.

From a study of the drawings and description it will be noted that the device operates not by producing a flow of liquid and then absorbing energy from such liquid by the use of blades, paddles or the like or by delivering it to some form of hydraulic motor. On the contrary the idea involved is the use of surfaces so closely juxtaposed that when a viscous oil or other liquid is interposed between the two, the two plates are brought each within the range of molecular attraction of the other through the common molecular attraction of each for the viscous oil. In other words the device is not a drive of the hydraulic type but is on the contrary an impositive or yielding drive dependent fundamentally on molecular attraction exerted by a liquid upon two closely juxtaposed surfaces which are nevertheless out of mechanical contact with each other. In view of the fact that the driving tendency thus produced may be varied either by a variation of the area of the surfaces so juxtaposed or by varying the interval between such surfaces within the limit of their mutual attraction through the interposed liquid, I regard these two methods of adjustment as equivalents and illustrate both in the drawing. In the form of the invention shown in Figs. 1 to 4 by using annuli slightly tapered and moving them axially with reference to each other, I increase the area of surfaces juxtaposed and also reduce the interval between the surfaces simultaneously. Consequently as the clutch members are intermeshed the drive action increases. In the form of the invention illustrated in Fig. 5 the interval between the surfaces remains constant and the effective area is varied by varying the number of disks in action. In either form of the device I may make use of a mechanical clutch adapted to engage at the limit of action of the viscous clutch and I have illustrated possible ways of making use of this idea with reference to both of the alternative structures illustrated.

Among other advantages of my clutch are the following: There are no steps from one speed to another, but the speed is increased and diminished through infinitesimal increments; and the speed for any clutch position is determined by the weight carried and the hill to be surmounted. There is practically no wear on the clutch, inasmuch as the parts do not touch metal to metal, except when driving at full engine speed, and then there is but a slight difference between such full speed and the maximum speed given by the liquid drive. Hence this fast clutch will not slip nor wear.

Further, this liquid drive may be used as a brake by simply shifting the reversing gear,—first reducing the extent of such drive in order to lessen shock, and then quickly increasing the extent of fluid adhesion and cohesion.

By increasing the diameter of the drum, it takes the place of a flywheel for the engine, and at the same time increases the torque of the fluid clutch.

What I claim as my invention and for which I desire Letters Patent is as follows, to wit:—

1. A power transmitting device comprising in combination two members mounted to rotate coaxially and relatively to each other, said members having mutually opposed interleaved surfaces of relatively large extent moving in close proximity to, but out of physical contact with each other; and a film of cohesive and adhesive liquid interposed between said opposed surfaces and adapted to bring them within a common range of molecular attraction.

2. A power transmitting mechanism comprising in combination two intermeshing sets of laminæ, the two sets being relatively and coaxially rotatable with adjacent surfaces of laminæ of opposite sets out of physical contact but in close juxtaposition; and films of cohesive and adhesive liquid interposed between such laminæ and adapted to bring the surfaces of each pair of opposed laminæ within a common range of molecular attraction.

3. A power transmitting device comprising in combination two members mounted to rotate coaxially and relatively to each other, said members having mutually opposed surfaces of relatively large extent moving in close proximity to, but out of physical contact with each other; a film of cohesive and adhesive liquid interposed between said opposed surfaces and adapted to bring them within a common range of molecular attraction; and means for varying the effective areas of said opposed surfaces.

4. A power transmitting device comprising in combination two members mounted to rotate coaxially and relatively to each other, said members having mutually opposed surfaces of relatively large extent moving in close proximity to, but out of physical contact with each other; a film of cohesive and adhesive liquid interposed between said opposed surfaces and adapted to bring them within a common range of molecular attraction; and means for shifting said members to move said opposed surfaces toward and from each other.

5. A power transmitting device comprising in combination two members mounted to rotate coaxially and relatively to each other, said members having mutually opposed surfaces of relatively large extent moving in close proximity to, but out of physical contact with each other; a film of cohesive and adhesive liquid interposed between said opposed surfaces and adapted to bring them within a common range of molecular attraction; and means for simultaneously varying the effective areas of said opposed surfaces and the interval between the same.

6. A power transmitting mechanism comprising in combination two intermeshing sets of laminæ, the two sets being relatively and coaxially rotatable with adjacent surfaces of laminæ of opposite sets out of physical contact but in close juxtaposition; films of cohesive and adhesive liquid interposed between such laminæ and adapted to bring the surfaces of each pair of opposed laminæ within a common range of molecular attraction; and means for varying the areas of effective surface of the two sets of laminæ.

7. A power transmitting mechanism comprising in combination two intermeshing sets of laminæ, the two sets being relatively and coaxially rotatable with adjacent surfaces of laminæ of opposed sets out of physical contact but in close juxtaposition; films of cohesive and adhesive liquid interposed between such laminæ and adapted to bring the surfaces of each pair of opposed laminæ within a common range of molecular attraction; and means for relatively shifting said opposed sets of laminæ to move their opposed surfaces toward and from each other.

8. A power transmitting mechanism comprising in combination two intermeshing sets of laminæ, the two sets being relatively and coaxially rotatable with adjacent surfaces of laminæ of opposed sets out of physical contact but in close juxtaposition; films of cohesive and adhesive liquid interposed between such laminæ and adapted to bring the surfaces of each pair of opposed laminæ within a common range of molecular attraction; and means for simultaneously varying the effective area of opposed sets of laminæ and the interval between the opposed surfaces of the same.

9. A power transmitting device comprising in combination two intermeshing sets of tapered concentric annuli, the two sets being relatively and coaxially rotatable with adjacent surfaces of annuli of opposite sets out of physical contact but in close juxtaposition; films of cohesive and adhesive liquid interposed between such annuli and adapted to bring the surfaces of each pair of opposed annuli within a common range of molecular attraction; and means for shifting said sets of annuli axially with respect to each other.

10. A power transmission device comprising driving members, driven members adapted to rotate in close proximity with the driving members but not in contact therewith, said members having extensive surfaces, a hollow drum incasing said members and adapted to keep them submerged in a liquid, and means visible at the exterior of said drum for revealing any variation in volume of said fluid contents.

11. A clutch comprising a driving member and a driven member inclosing between them a space containing a suitable liquid, said members being relatively movable so as to enlarge or contract said space, the walls formed by the two members having faces adapted to be brought opposite one another into close and parallel relationship when said space is contracted so as to form between them a film of liquid by means of which the rotation of the driving member is imparted to the driven member, and means to receive and return the liquid displaced in the contraction of said space.

12. A clutch comprising a driving member and a driven member inclosing between them a space containing a suitable liquid, said members being relatively movable so as to enlarge or contract said space, the walls formed by the two members having parallel faces adapted to be brought into close relationship when said space is contracted so as to form between them a film of liquid by means of which the rotation of the driving member is imparted to the driven member, and means to receive and return the liquid displaced in the contraction of said space.

13. A clutch comprising a driving shaft, a driving clutch member secured thereto, a driven shaft rotatable in said driving member, a driven clutch member turning with the driven shaft and slidable upon the driving clutch member to form between them a space adapted to contain a suitable liquid, said clutch members presenting complementary faces adapted to be approximated when driven clutch member is slid in one direction, thereby forming a film of said liquid between said complementary faces to create a driving engagement between the clutch members, and means to receive and return the liquid displaced in the contraction of said space.

14. A clutch comprising means forming two communicating spaces adapted to contain a suitable liquid, said means including a driving clutch member and a driven clutch member forming between them one of said spaces, and means to move the driven clutch member to enlarge or contract said space, said driven clutch member adapted, in said movement, as it enlarges one space to contract the other space, the walls formed by the two clutch members having faces adapted to be brought into close and parallel relationship when the space between them is contracted so as to form between them a film of liquid by means of which the rotation of the driving member is imparted to the driven member.

In testimony that I claim the foregoing invention, I have hereunto set my hand this 20th day of January, 1912.

MELVIN L. SEVERY.

Witnesses:
HENRY C. MULLIGAN,
A. B. UPHAM.